United States Patent [19]

Marchant et al.

[11] Patent Number: 4,459,341

[45] Date of Patent: Jul. 10, 1984

[54] HIGH TEMPERATURE SOLID ELECTROLYTE FUEL CELL WITH CERAMIC ELECTRODES

[75] Inventors: David D. Marchant; J. Lambert Bates, both of Richland, Wash.

[73] Assignee: The United States of America as represented by the United States Department of Energy, Washington, D.C.

[21] Appl. No.: 463,204

[22] Filed: Feb. 2, 1983

[51] Int. Cl.³ .............................................. H01M 8/12
[52] U.S. Cl. ........................................ 429/33; 429/40; 429/41; 252/521
[58] Field of Search ............... 429/30, 33, 40, 41, 429/44, 45; 252/62.2, 518, 520, 521; 204/195 S

[56] References Cited

U.S. PATENT DOCUMENTS

| | | | |
|---|---|---|---|
| Re. 28,792 | 4/1976 | Ruka et al. | 204/195 S |
| 3,472,697 | 10/1969 | Sandstede et al. | 429/32 |
| 3,554,811 | 1/1971 | Isenberg et al. | 429/30 |
| 3,558,360 | 1/1971 | Sverdrup et al. | 429/33 |
| 3,578,502 | 5/1971 | Tannenberger et al. | 429/44 |
| 3,607,433 | 9/1971 | Isenberg et al. | 427/115 |
| 3,754,995 | 8/1973 | Kleinschmager | 429/33 |
| 3,981,746 | 9/1976 | Bezaudun et al. | 429/33 X |
| 4,130,693 | 12/1978 | Van Den Berghe | 429/41 |
| 4,275,126 | 6/1981 | Bergmann et al. | 429/30 |
| 4,292,209 | 9/1981 | Marchant et al. | 252/521 |

Primary Examiner—Anthony Skapars
Attorney, Agent, or Firm—Robert Southworth, III; Richard E. Constant; Michael F. Esposito

[57] ABSTRACT

A solid oxide electrolyte fuel cell is described having a central electrolyte comprised of a $HfO_2$ or $ZrO_2$ ceramic stabilized and rendered ionically conductive by the addition of Ca, Mg, Y, La, Nd, Sm, Gd, Dy Er, or Yb. The electrolyte is sandwiched between porous electrodes of a $HfO_2$ or $ZrO_2$ ceramic stabilized by the addition of a rare earth and rendered electronically conductive by the addition of $In_2O_3$. Alternatively, the anode electrode may be made of a metal such as Co, Ni, Ir Pt, or Pd.

5 Claims, 1 Drawing Figure

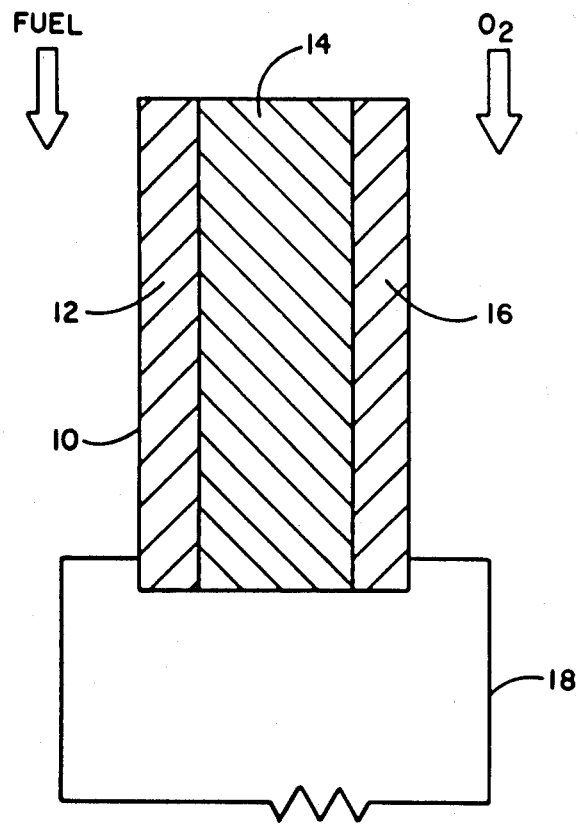
FIG.

HIGH TEMPERATURE SOLID ELECTROLYTE FUEL CELL WITH CERAMIC ELECTRODES

BACKGROUND OF THE INVENTION

The invention relates to fuel cells, and more particularly to fuel cells having a solid electrolyte. The United States Government has rights in this invention pursuant to Contract No. DE-AC06-76RLO 1830 between the U.S. Department of Energy and Battelle Memorial Institute.

A fuel cell converts chemical energy directly to low voltage, direct current electrical energy by the electrochemical oxidation of fuel. The process is theoretically isothermal, highly efficient, clean and, in principle, can be used in small and large electrical power systems. Fuel cells are similar to batteries in operation with two electrodes separated by an electrolyte, but the electrodes remain essentially unchanged and energy is not stored. Fuel supplied to the anode liberates electrons to an external circuit for useful work. The electrons from the external circuit react with the oxidant at the cathode. Ions formed at either the anode or cathode migrate through the solid electrolyte to balance the electron flow. The electrolyte is impervious to the fuel and oxidant to prevent direct interaction.

Fuel cells are divided into three broad classifications: phosphoric acid electrolyte fuel cell using hydrogen fuel at operating temperatures of 470 K.; molten carbonate electrolyte fuel cell using carbon monoxide or hydrogen as fuel at operating temperatures near 920 K.; and solid oxide electrolyte fuel cell using hydrogen, carbon monoxide, and hydrocarbons as fuel at operating temperatures of 1270 K. or above.

Since they operate at relatively low temperatures, both the phosphoric acid and molten carbonate fuel cells are limited by the rates of electrochemical reaction at the electrode-electrolyte interface. To increase these rates at lower operating temperatures requires catalytic surfaces and dictates the use of hydrogen as fuel. Because of the higher operating temperature of the solid oxide electrolyte fuel cell, the electrochemical reaction rates are high enough so that catalytic surfaces are not required and a wider variety of fuel can be used.

In the solid oxide electrolyte fuel cells, the selection of electrodes (primarily the cathode) a major concern because of the highly oxidizing conditions at the cathode and only noble metals such as Pt, Ir, Pd, or Au or highly electronically conducting oxides can be used. The noble metals suffer the disadvantage of being very expensive and have questionable long term mechanical and chemical stability. Those solid oxides which have been previously proposed as electrodes have each been limited because: some such as SnO, $PrCoO_3$, $Pr_6O_{11}$, and $La(Sr)CrO_3$, are thermally or chemically incompatible with the electrolyte; and still others such as $In_2O_3$ and $Ni(Li)O$ are thermally or electrically unstable.

These and other unique problems associated with solid electrolyte fuel cells require that the electrode materials be stable and thermomechanically compatible with the electrolyte at high operating temperatures in both oxidizing and reducing conditions.

It is, accordingly, a general object of this invention to provide a fuel cell which is capable of operating at high temperatures and can accept a wide range of fuels without the use of a catalytic surface.

It is a further object of this invention to provide a solid oxide electrolyte fuel cell having electrodes which are stable and compatible with the electrolyte at high operating temperatures.

Other objects, advantages, and novel features of the invention will be apparent to those of ordinary skill in the art upon examination of the following detailed description of a preferred embodiment and the accompanying drawing.

SUMMARY OF THE INVENTION

A high temperature solid electrolyte fuel cell is provided which has an ionically conducting ceramic solid electrolyte based on an oxide stabilized $HfO_2$ or $ZrO_2$ ceramic sandwiched between electronically conducting porous ceramic electrodes based on $In_2O_3$—$RE_xO_y$—$HfO_2/ZrO_2$ with the fuel cell electrode(s) and electrolyte being fabricated at the same time as an integral unit with the electrode(s) intimately bonded to the electrolyte. Alternatively, the anode electrode may comprise a porous metal.

BRIEF DESCRIPTION OF THE DRAWING

The FIGURE is a simplified cross-sectional view of the fuel cell of the invention.

DESCRIPTION OF THE PREFERRED EMBODIMENT

Turning now to the FIGURE, the general arrangement of the fuel cell 10 is illustrated. A centermost member 14 is a generally planar piece of solid oxide electrolyte which is sandwiched between two electrodes: a porous anode 12 and a porous cathode 16. The electrolyte may be made of a $ZrO_2$ based ceramic which can be stabilized with the addition of Ca, Mg, or appropriate rare earths to temperatures as high as 1423 K. The electrolyte may also be made of ceramic based on $HfO_2$, which although more expensive, can be stabilized to temperatures as high as 2073 K. Of the rare earths, it has been found that Y, La, Nd, Sm, Gd, Dy, Er, and Yb will stabilize the ceramic while imparting the desired ionic conductivity. It has further been found that Ce, Pr, and Tb are not suitable since they impart electronic conductivity rather than ionic conductivity. Suitable compositions for the solid oxide electrolyte would range between 5% to 35% (all percentages expressed as mole percent) of Ca, Mg, Y, La, Nd, Sm, Gd, Dy, Er, Yb, or mixtures thereof and between 65% and 95% $HfO_2$ or $ZrO_2$.

The electrodes 12 and 16 may be made from a very similar composition. In this case the electrode ceramic is $HfO_2$ or $ZrO_2$ stabilized with a rare earth and made electronically conductive with $In_2O_3$. Contrary to the experience with the solid electrolyte, any of the rare earths (abbreviated $RE_xO_y$) may be used since the addition of $In_2O_3$ dominates and the resulting ceramic is generally electronically conductive. This effect is not uniform. Some oxides such as $PrO_2$ result in significantly greater conductivity than others such as $Y_2O_3$. Suitable electrode compositions would range between 25% to 65% $In_2O_3$, 5% to 25% $RE_xO_y$, and from 10% to 70% $HfO_2$ or $ZrO_2$. The $In_2O_3$—$RE_xO_y$—$HfO_2$/$ZrO_2$ family of ceramics has previously been explored for use in MHD generators in U.S. Pat. No. 4,292,209 which is incorporated herein by reference.

The fuel cell can be fabricated as an integral body using sintering, hot pressing, high rate impaction or other conventional techniques. Addition of an organic material such as sawdust prior to sintering can provide a desired porous structure in the electrodes. This fuel cell is unique in that it uses electrodes and electrolyte with the same $RE_xO_y$—$HfO_2/ZrO_2$ base which allows the electrodes and electrolyte to be fabricated at the same time into a single, integrally bonded cell during the same fabrication operation. This is possible because both the electrodes and electrolyte exhibit similar thermal, physical, and chemical properties and provide intimate bonding which does not separate on heating and cooling.

An alternative, albeit less desirable, anode electrode may be made using porous metal such as Co, Ni, Pt, or Pd. These materials may have acceptable properties for the reducing conditions of the anode where they would not be acceptable for the oxidizing conditions of the cathode.

EXAMPLE

A fuel cell as a described above was fabricated by placing two layers of coprecipitated powder of the two compositions in a die and cold die pressing at 103 MPa, isostatic pressing at 172 MPa, and then sintering near 1770 K. in air for 8 hours. With these preparations, the two powders were found to sinter under the same conditions. The resulting sintered compact was cut with a diamond saw to a thickness of 3.175 mm having a single electrode of 0.8 mm and a solid electrolyte of 2.4 mm. The active area of the cell was 120 mm$^2$. In practice, of course, two electrodes would be so fabricated, but for testing purposes, a single electrode better monitors the ceramic properties. The missing electrode was provided by a layer of platinum.

The electrode composition was 39% $In_2O_3$, 17% $PrO_2$, 3% $Yb_2O_3$, and 41% $HfO_2$. The addition of 5 weight percent sawdust (−40 mesh Tyler) prior to sintering gave a porous structure to the electrode.

The composition of the solid electrolyte was 6.8% $Y_2O_3$ and 93.2% of $HfO_2$.

The fuel cell with the ceramic electrode as the cathode (i.e., exposed to air) was placed in a test furnace with Ar-4% $H_2$ as the fuel. The fuel cell was tested for 300 hours at temperatures between 1184 K. and 1307 K. At 1295 K., the cell produced 2.04 mW of power with a potential of 0.27 volts and a current of 7.26 mA across a 25 ohm resistor. Open circuit potential was 0.499 volts.

The fuel cell was then reversed and placed in the test furnace with the ceramic electrode as the anode (i.e., exposed to the Ar-4% $H_2$ fuel). The fuel cell was tested for 48 hours at temperatures between 1266 K. and 1288 K. for 48 hours. At 1266 K. the cell produced 0.09 mW of power with a potential of 0.3 volts and a current of 0.3 mA across a 1000 ohm resistor. Open circuit potential was 0.61 volts. No degradation of the cell, the electrode, or the electrolyte was observed.

The foregoing description of a preferred embodiment of the inventor has been presented for purposes of illustration and description and is not intended to be exhaustive or to limit the invention to the precise form disclosed. It was chosen and described in order to best explain the principles of the invention and their practical application to thereby enable others skilled in the art to best utilize the invention in various embodiments and with various modifications as are suited to the particular use contemplated. It is intended that the scope of the invention be defined by the claims appended hereto.

We claim:

1. A high temperature solid electrolyte fuel cell comprising:
   (a) a porous cathode comprising a member of $In_2O_3$—$RE_xO_y$—$HfO_2/ZrO_2$ electronically conducting ceramic;
   (b) a porous anode comprising a member of $In_2O_3$—$RE_xO_y$—$HfO_2/ZrO_2$ electronically conducting ceramic or of metal; and
   (c) sandwiched therebetween, a solid electrolyte compromising a member of oxide stabilized $HfO_2$ or $ZrO_2$ ionically conducting ceramic; and
   (d) wherein the electrolyte and at least the cathode are fabricated and intimately bonded concurrently into an integral unit.

2. The fuel cell of claim 1 wherein the electronically conducting ceramic comprises from 25% to 65% $In_2O_3$, from 5% to 25% $RE_xO_y$, and from 10% to 70% $HfO_2$ or $ZrO_2$.

3. The fuel of claim 1 wherein the ionically conducting ceramic comprises from 5% to 35% Ca, Mg, Y, La, Nd, Sm, Gd, Dy, Er, or Yb oxides and from 65% to 95% $HfO_2$ or $ZrO_2$.

4. The fuel cell of claim 1 wherein the metal is Co, Ni, Ir, Pt, or Pd.

5. The fuel cell of claim 1 wherein the cathode, anode, and electrolyte comprise a unitary, integrally bonded cell fabricated concurrently in the same fabrication process with the electrodes intimately bonded to the electrolyte.

* * * * *